United States Patent [19]
Costes

[11] 3,990,942
[45] Nov. 9, 1976

[54] REMOVABLE AUXILIARY LID FOR HANDLING THE FUEL ELEMENTS OF A NUCLEAR REACTOR CORE

[75] Inventor: Didier Costes, Paris, France

[73] Assignee: Commissariat a l'Energie Atomique, Paris, France

[22] Filed: Nov. 8, 1974

[21] Appl. No.: 522,286

[30] Foreign Application Priority Data
Nov. 8, 1973    France .............................. 73.39714

[52] U.S. Cl. .................................. 176/87; 176/30; 176/37
[51] Int. Cl.² ......................................... G21C 19/10
[58] Field of Search .................... 176/30, 31, 32, 87, 176/37

[56] References Cited
UNITED STATES PATENTS

| | | | |
|---|---|---|---|
| 3,140,792 | 7/1964 | Harris | 176/87 X |
| 3,322,637 | 5/1967 | Middleton et al. | 176/30 |
| 3,841,964 | 10/1974 | Dumayne | 176/87 X |

FOREIGN PATENTS OR APPLICATIONS

| | | | |
|---|---|---|---|
| 1,587,236 | 2/1970 | France | |
| 434,497 | 10/1967 | Switzerland | 176/30 |

*Primary Examiner*—Samuel Feinberg
*Assistant Examiner*—Peter A. Nelson
*Attorney, Agent, or Firm*—Cameron, Kerkam, Sutton, Stowell & Stowell

[57] ABSTRACT

The auxiliary lid permits temporary closure of the reactor core shroud during charge/discharge operations after removal of the closure head of a pressurized water or boiling water reactor. The auxiliary lid has an outer closure plug mounted for rotational motion on the top edge of the reactor core shroud. An inner closure plug which carries a vertical guide channel is rotatably mounted on the outer closure plug in eccentric relation thereto so as to place the guide channel above each fuel element as a result of displacement of both closure plugs in rotational motion.

7 Claims, 2 Drawing Figures

REMOVABLE AUXILIARY LID FOR HANDLING THE FUEL ELEMENTS OF A NUCLEAR REACTOR CORE

This invention relates to a removable auxiliary nuclear reactor lid for handling the fuel elements of the reactor core.

In more exact terms, the present invention relates to nuclear reactors in which the fuel elements constituting the reactor core are charged and discharged vertically after removal of the reactor tank lid, this handling operation being carried out especially underwater at ambient pressure. This is the case in particular with pressurized water reactors and boiling water reactors. The intended function of the removable auxiliary lid is to facilitate charge/discharge operations and to achieve a higher standard of reliability in fuel handling.

The operations involving charge and discharge of fuel elements are usually performed by means of a telescopic arm positioned from a platform which moves above the level of the water. It is known that the degree of accuracy required for vertical alignments results in time-consuming operations. The fuel elements are engaged by the grab of the telescopic arm and displaced above the reactor core which is no longer protected and provision must accordingly be made for the possibility of dropping of the fuel element which is being handled. Such an incident would give rise to multiple ruptures of the cans surrounding the fuel material and would obviously result in radioactive contamination of the fuel-handling hall. This therefore entails the need to adopt special precautionary measures for purposes of confinement.

It is also known that the charge and discharge of nuclear fuel assemblies are highly delicate operations. It is therefore extremely useful to ensure that guiding of the fuel assemblies during these operations is carried out with maximum precision. Such operations will be easier if they are performed under direct visual control, that is to say without the presence of any element which forms a screen between the exterior of the reactor tank (after removal of the closure head or lid) and the reactor core.

The precise aim of the present invention is to provide a removable auxiliary lid which overcomes the disadvantages mentioned in the foregoing insofar as it facilitates the vertical positioning of the fuel element to be introduced into the reactor core and achieves enhanced safety at the time of handling of the fuel element above the reactor core by preventing said fuel element from falling onto the core and making it possible to perform these operations under direct visual control.

The removable auxiliary lid for a reactor of the type comprising a core shroud and in which the fuel element charge and discharge operations are carried out at the time of reactor shutdown in a vertical direction after removal of the reactor lid is characterized in that it comprises a first closure plug whose periphery is intended to be placed on the top edge of said core shroud, said first closure plug being intended to support a second closure plug which is displaced off-center with respect to the axis of the reactor, said second closure plug being adapted to carry a vertical guide channel, and means for setting the first closure plug in rotation with respect to said core shroud and for setting the second closure plug in rotation with respect to said first plug, the position of the axis of the second plug with respect to the axis of the first plug and the distance between the axis of said second plug and the guide channel being such that said guide channel can be placed above each fuel element of the reactor core by displacing the two closure plugs in rotational motion.

In a preferred embodiment, each closure plug is constituted by a rigid framework on which is fixed a flooring element consisting of a metallic grating, the pitch of said grating being sufficient to permit direct viewing of the reactor core through said flooring element, said grating being formed of material which enables it to absorb the energy corresponding to the free fall of a fuel element during a handling operation.

As a preferable feature, the first closure plug is supported on the top edge of the reactor core shroud by means of runner-wheels and the first closure plug is provided with a motor which drives a pinion, said pinion being disposed in meshing engagement with a toothed annulus which is rigidly fixed to the periphery of said core shroud.

Similarly, the second closure plug is supported on the first plug by means of runner-wheels, said first plug being provided with a second motor which drives a pinion, said pinion being disposed in meshing engagement with a toothed annulus which is rigidly fixed to the external periphery of said second closure plug.

In accordance with another characteristic feature, each motor is remotely operated by means of electric cables.

A more complete understanding of the invention will in any case be gained from the following description of one embodiment of the invention which is given by way of example but not in any limiting sense, reference being made to the accompanying drawings, in which.

Figure 1:
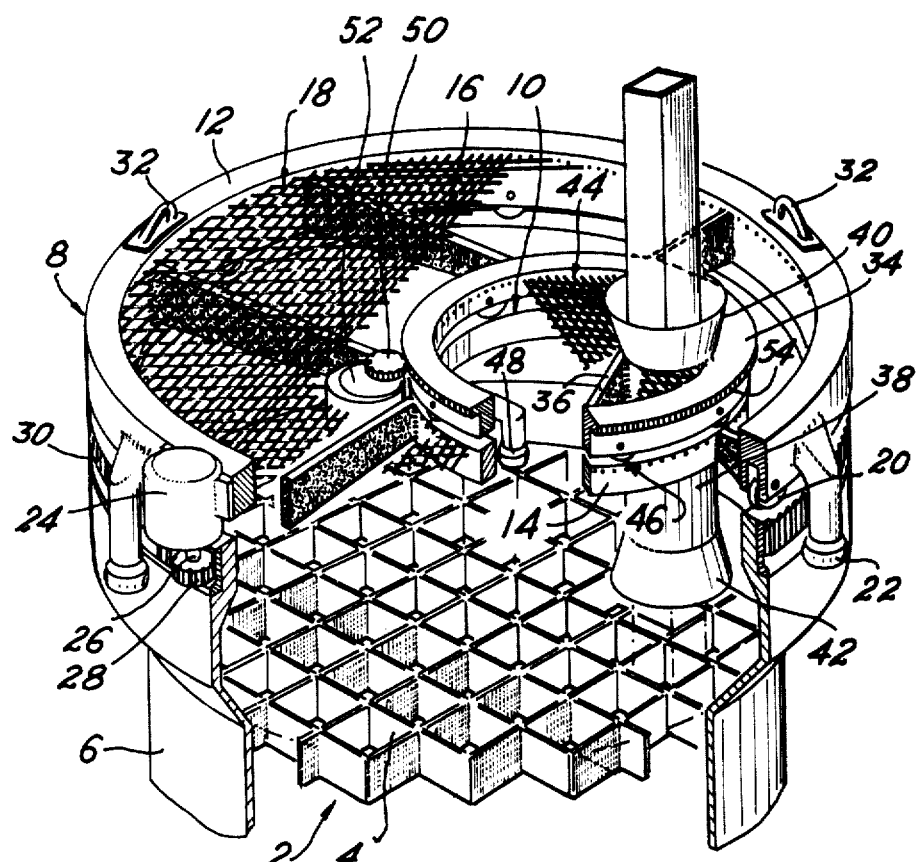
FIG. 1 is a view in perspective showing the auxiliary closure unit or lid in accordance with the invention, only three-quarters of the first closure plug being shown for the sake of enhanced clarity.

The fuel elements are maintained at the upper extremities thereof by means of a spacer grid 2 having square compartments such as the compartment 4. The spacer grid 2 is secured at its periphery to the shroud 6 of the reactor core. The core shroud 6 has an extension above the spacer grid 2, said extension being adapted under operating conditions to receive the core closure head or lid which carries the steam separators.

The removable auxiliary lid proper is constituted by a first closure plug 8 having the same axis as the core shroud 6 and by a second closure plug 10 which is smaller in diameter than the first closure plug and the axis of which is displaced off-center with respect to the axis of the core shroud 6. The first closure plug 8 or large plug is constituted by a metallic structural framework formed by an outer lid ring 12 which can be positioned in register with the top edge of the reactor core shroud 6 and by an inner lid ring 14 which is displaced off-center with respect to the axis of the outer lid ring 12, the two lid rings being joined together by structural members such as the member 16. The space limited by the two rings 12 and 14 is covered by a flooring element 18 consisting of a metallic grating which is secured at the periphery to the two lid rings and to the structural members 16. Provision is therefore made within the inner lid ring 14 for an opening which is not fitted with a grating.

The first closure plug 8 is supported on the top edge of the reactor core shroud 6 by means of runner-wheels such as 20 having a horizontal axis and is guided by runner-wheels such as 22 having a vertical axis which are applied against the vertical outer face of the core shroud 6. The first closure plug 8 can be set in rotation with respect to the shroud 6 by means of a motor 24 which is rigidly fixed to the outer lid ring 12, the shaft 26 of said motor being intended to drive a toothed pinion 28 having a vertical axis. The pinion 28 is disposed in meshing engagement with a toothed annulus 30 formed on the outer face of the core shroud 6. The first closure plug 8 is further provided on the outer lid ring 12 with handling rings such as the ring 32.

The second closure plug 10 is constituted by a framework comprising a flanged top ring 34 and structural members such as the member 36. The second closure plug 10 supports a vertical guide channel 38 constituted by a vertical cylinder provided with cones 40 and 42 respectively at the upper and lower extremities of said cylinder. The guide channel 38 is rigidly fixed to the closure plug 10 by means of the structural members 36. The surface of the second closure plug 10 which is limited by the guide channel 38 and the flanged top ring 34 is covered by a flooring element 44 consisting of a grating which is fixed on said structural member. The top ring 34 is placed in register with the ring 14 of the closure plug 8 and is carried on said ring 14 by means of runner-wheels, namely runner-wheels such as 46 which have a vertical axis and runner-wheels such as 48 which have a horizontal axis. Setting of the second closure plug 10 in rotational motion is carried out by means of a toothed pinion 50 driven by a motor 52 which is fixed on the inner ring 14. The pinion 50 is disposed in meshing engagement with a toothed ring 54 which is fixed on the outer periphery of the flanged top ring 34.

It is worthy of note that the axis of the guide channel 38 is displaced off-center with respect to the axis of the second closure plug 10. In more exact terms, the distance between the axis of the plug 8 and the axis of the plug 10 and the distance between the axis of the plug 10 and the axis of the guide channel 38 are such that said guide channel is capable of moving into position above each fuel element of the reactor core.

The motors 24 and 52 (which are preferably electric motors) are obviously equipped with supply leads for controlling their direction of rotation, said leads having been omitted from the drawings. Moreover, the gridwork flooring elements 18 and 44 have a pitch such as to permit easy viewing of the entire reactor core. In addition, said flooring elements are formed of a steel or an alloy such as to permit absorption of the energy corresponding to the free fall of a fuel element which may occur during a handling operation.

Figure 2:
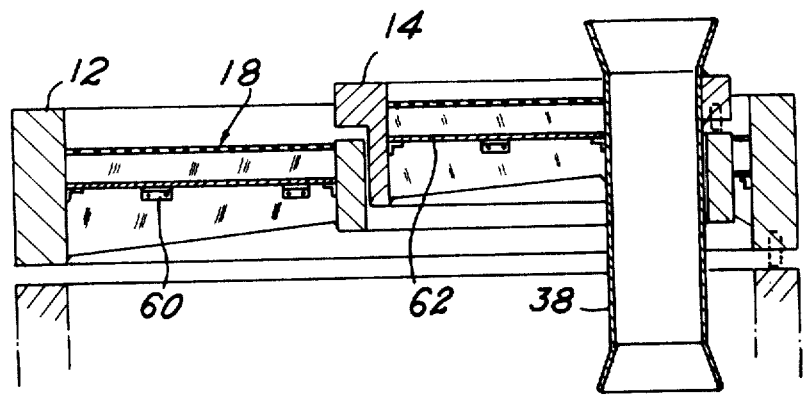
FIG. 2 is a vertical sectional view taken along a diametrical plane and showing an alternative form of construction of said auxiliary lid.

There is shown in FIG. 2 an alternative form of construction of the removable lid. In this alternative embodiment, the handling operations can always be performed under direct visual control but there is added to the closure plug a "second line of protection" against objects of very small size which might be able to pass through the interstices of the grating 18.

To this end, a solid transparent plate is secured beneath each flooring element 18 and 14 respectively of the large and the small closure plug. A first plate 60 is provided in the case of the large plug and a second plate 62 is provided in the case of the small plug. These two plates obviously have the same contours as the flooring elements 18 and 44.

The plate 60 is fixed on the structural members 12 and 14 by any suitable means. Provision can also be made for additional cross-members in order to support the plate 60. Similarly, the plate 62 is fixed on the flanged ring 34 and on the periphery of the guide channel 38. Each plate can be formed in one piece or in a number of sections and can also consist of one or more thicknesses.

In order to form the plates 60 and 62, recourse must be had to a transparent material which has good mechanical impact strength and which is capable of withstanding fairly high temperatures. By way of example, it is possible to make use of wired glass or a synthetic product which is available commercially under the name of Plexiglas and made of polymethyl methacrylate.

The installation of the removable auxiliary lid is carried out as follows. After a period of reactor operation, the reactor is shut down and cooled, the closure head being then removed. The components located above the reactor core are also removed and the auxiliary handling lid is moved downwards by means of the lifting rings 32. References are then taken for positioning in rotational motion and it is only necessary to start-up the motors 24 and 52 in order to bring the guide channel 38 above the position of the fuel element to be handled. The handling-arm platform is placed in position at the same time. The refuelling operations are then carried out very rapidly by virtue of the accuracy of positioning of the fuel element which is achieved immediately and independently of any movements of water and thermal expansions. After these operations, the auxiliary lid is removed and the closure head of the reactor is put back in position.

The lightweight auxiliary lid of ductile material prevents all impacts on the fuel elements at the time of free falls resulting from handling errors or from failure of the handling arm. By virtue of its lightweight construction and low-power drive motors, the lid would not be liable to damage the fuel element during its displacement if the movements of rotation were carried out accidentally. Since the lid does not remain permanently within the reactor tank, it can accordingly be of much simpler constructional design.

What we claim is:

1. A removable auxiliary lid for a reactor of the type comprising a core shroud and in which the fuel element charge and discharge operations are carried out at the time of reactor shutdown in a vertical direction after removal of the reactor lid, wherein said auxiliary lid comprises a first closure plug whose periphery is placed on the top edge of said core shroud, said first closure plug supporting a second separate closure plug displaced off-center with respect to the axis of the reactor, said second closure plug carrying a vertical guide channel, and means for rotating the first closure plug with respect to said core shroud and for rotating the second closure plug with respect to said first closure plug, the position of the axis of the second closure plug with respect to the axis of the first closure plug and the distance between the axis of said second closure plug and said guide channel being such that said guide channel can be placed above each fuel element of the reactor core by rotating said closure plugs, said closure plugs including a rigid framework, a flooring element fixed on said framework and consisting of a metallic grating, the pitch of said grating being sufficient to permit direct viewing of the reactor core through said flooring element, said grating being of a material absorbing the energy corresponding to the free fall of a fuel element during a handling operation.

2. A removable auxiliary lid according to claim 1, wherein said first and second closure plugs include beneath the floor grating a solid plate rigidly fixed to said floor grating and of transparent material having high mechanical impact strength.

3. A removable auxiliary lid according to claim 2, wherein said plates are of wired glass.

4. A removable auxiliary lid according to claim 2, wherein said plates are of polymethyl methacrylate.

5. A removable auxiliary lid according to claim 1 said first closure plug being supported on the top edge of the reactor core shroud by runner-wheels and a motor for said first closure plug driving a pinion, said pinion meshing with a toothed annulus rigidly fixed to the periphery of said core shroud.

6. A removable auxiliary lid according to claim 5, said second closure plug being supported on said first plug by runner-wheels, a second motor for said first closure plug driving a second pinion, said second pinion meshing with a second toothed annulus rigidly fixed to the periphery of said second closure plug.

7. A removable auxiliary lid according to claim 6, said motors being electric motors and including cables for power supply and remote control for said motors.

* * * * *